(12) United States Patent
Wode

(10) Patent No.: US 6,171,065 B1
(45) Date of Patent: Jan. 9, 2001

(54) COMPRESSOR THAT CAN BE SWITCHED ON AND OFF ON DEMAND AND METHOD FOR CONTROLLING OR REGULATING SUCH A COMPRESSOR

(75) Inventor: Stefan Wode, Langenhagen (DE)

(73) Assignee: Continental Aktiengesellschaft, Hannover (DE)

( * ) Notice: Under 35 U.S.C. 154(b), the term of this patent shall be extended for 0 days.

(21) Appl. No.: 09/266,740

(22) Filed: Mar. 12, 1999

(30) Foreign Application Priority Data

Mar. 12, 1998 (DE) .............................. 198 10 764

(51) Int. Cl.⁷ .................................................... F04B 49/10
(52) U.S. Cl. ................................................................ 417/32
(58) Field of Search .............................. 417/32, 53, 44.1, 417/44.2

(56) References Cited

FOREIGN PATENT DOCUMENTS

| 3118221 | 3/1982 | (DE) . |
|---|---|---|
| 3237251 | 4/1984 | (DE) . |
| 3919407 | 1/1990 | (DE) . |
| 4333591 | 4/1995 | (DE) . |
| 19621946 | 9/1997 | (DE) . |

*Primary Examiner*—Teresa Walberg
*Assistant Examiner*—Vinod D Patel
(74) *Attorney, Agent, or Firm*—Smith, Gambrell & Russell, LLP

(57) ABSTRACT

A method for controlling or regulating a compressor 4 that can be switched on and off on demand, wherein a control unit 6 that switches the compressor 4 on and off is provided with the compressor. In a method of this type, it must be ensured that the compressor 4 is not damaged due to overheating. This is attained due to the fact that the control unit 6 operates the compressor 4 continuously during a regulating process until a limiting value is reached, and that said control unit operates the compressor in a cyclic manner once the limiting value is reached. This method makes it possible to complete regulating processes even if a critical limiting value is already reached.

11 Claims, 7 Drawing Sheets

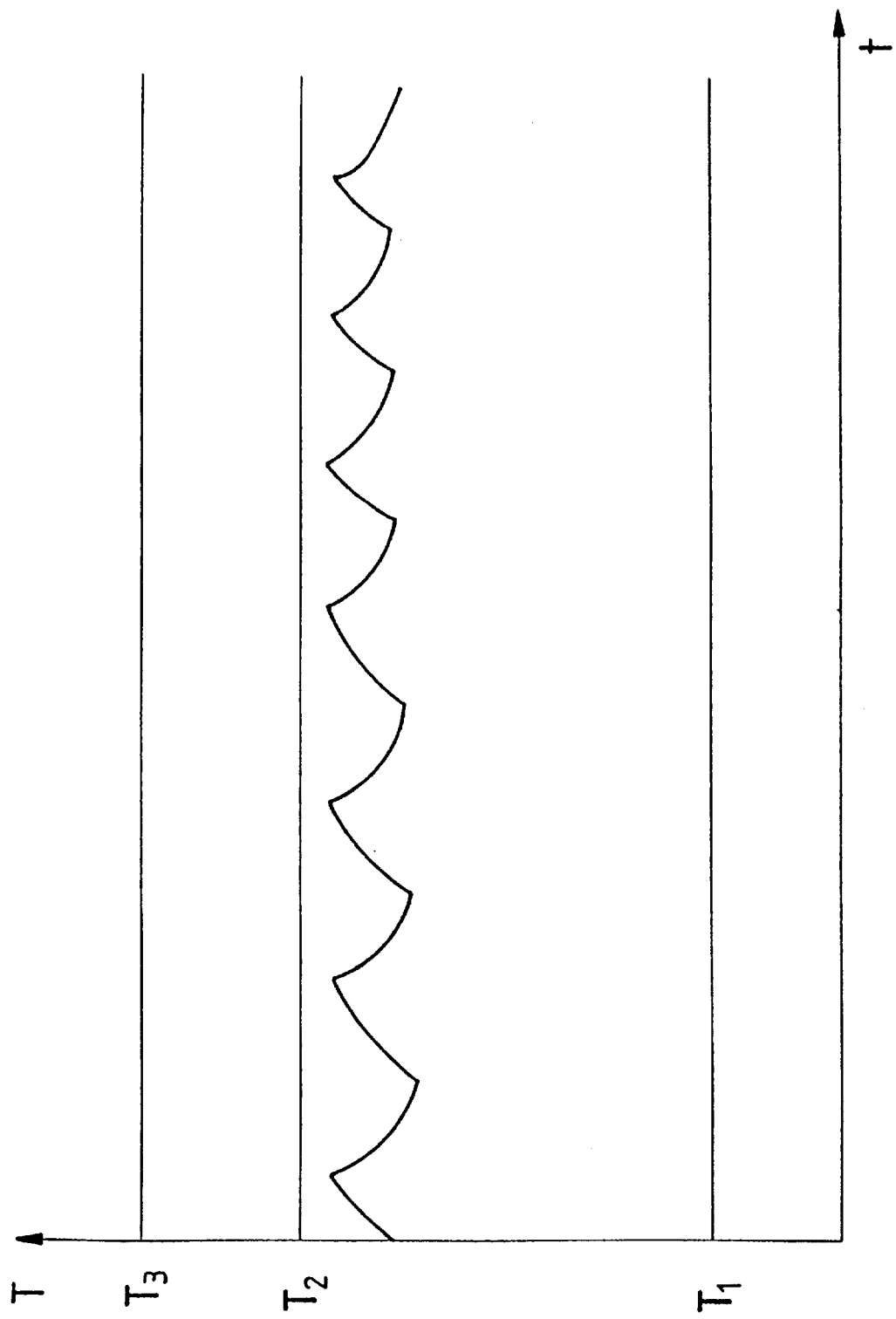

though not used in the compressor according to the invention for cost and susceptibility reasons.

COMPRESSOR THAT CAN BE SWITCHED ON AND OFF ON DEMAND AND METHOD FOR CONTROLLING OR REGULATING SUCH A COMPRESSOR

INTRODUCTION AND BACKGROUND

The present invention pertains to a method for controlling or regulating a compressor or motor that can be switched on and off on demand, wherein a control unit that switches the compressor on and off is provided with the compressor. The invention also pertains to a compressor or motor that can be switched on and off on demand, wherein a control unit that switches the compressor on and off is provided with the compressor.

Some modern motor vehicles are equipped with a pneumatic rear suspension in order to maintain the height of the motor vehicle constant, independently of the motor vehicle load. If the motor vehicle needs to be raised after being loaded, the pneumatic springs are supplied with compressed air via a compressor. While the compressor is switched on, heat is developed in the compressor, leading to a temperature increase. If this temperature becomes excessively high, the compressor may be damaged. This is, in particular, the case if the motor vehicle is repeatedly subjected to heavy loads and the motor vehicle body is raised to the previous level with the aid of the pneumatic suspension. However, the compressor may also be damaged due to the improper utilization of the pneumatic suspension. Due to these circumstances, it is important to protect overheating of the compressor while it is switched on.

A compressor that can be switched on and off on demand is known from DE 196 21 946, wherein a control unit that switches the compressor on and off is provided with the compressor. The compressor is equipped with an overload protection means that protects it from overheating and functions as described below: while the compressor is switched on, the temperature in the compressor is estimated with the aid of the control unit based on the on-time of the compressor. The control unit switches off the compressor as soon as the estimated value exceeds an upper temperature threshold, above which the compressor may be damaged. Due to this measure, the compressor is able to cool off. An estimated value for the temperature in the compressor is also calculated in the control unit during the cooling-off phase. As soon as this estimated value falls short of a lower temperature threshold, the control unit switches the compressor on or allows the compressor to be switched on at a later time if the compressor is currently not needed.

The method for controlling or regulating a compressor that can be switched on and off on demand, which is known from DE 196 21 946 C1, can be carried out without temperature sensors because only estimated values for the temperature of the compressor are calculated in the control unit. In addition, the compressor of the pneumatic suspension is reliably protected from overheating, i.e., damage to the compressor is largely precluded, namely even if the pneumatic suspension is improperly actuated. However, it was determined that the upper temperature threshold is always reached or exceeded while the compressor is in use, i.e., the regulating process is interrupted by the control unit. This means that the regulating process is, if at all, only completed after a relatively long time delay, i.e., after the compressor has cooled off below the lower temperature threshold. Since the compressors of pneumatic suspension systems are, in most instances, well encapsulated for acoustic reasons and as protection from mechanical damage, the cooling-off time may last between a few minutes and 15 min. Such a long interruption or delay in the regulating process is unacceptable.

It is therefore an object of the present invention to develop a method for controlling or regulating a compressor or motor that can be switched on and off on demand, in which interruptions of the regulating processes are largely prevented.

Another object of the present invention is to develop a compressor or motor that can be switched on and off on demand, wherein a control unit that switches the compressor on and off is provided with the compressor that serves for carrying out the aforementioned method.

SUMMARY OF THE INVENTION

The above and other objects of the invention can be achieved by a compressor that operates continuously until it reaches a limiting value, where the compressor is operated in a cyclic manner by the control unit once it reaches this limiting value. It is a feature of the invention that the compressor can be continuously operated by the control unit until it reaches a limiting value, and that the compressor can be operated in a cyclic manner once it reaches this limiting value.

The limiting value either consists of a temperature-limiting value or a time-limiting value. If a temperature-limiting value is used, the temperature of the compressor can be measured with the aid of a temperature sensor or the like. However, temperature sensors or the like are not used in the compressor according to the invention for cost and susceptibility reasons. In this case, the temperature of the compressor can be estimated, e.g., by the methods known from DE 19,621,946 C1 or DE 4,333,591 A1. Alternatively, a time-limiting value is used as the limiting value. In this case, the on-time of the compressor is monitored by the control unit, e.g., by means of a counter, and the compressor is operated in a cyclic manner once the on-time of the compressor exceeds the time-limiting value.

BRIEF DESCRIPTION OF THE DRAWINGS

One embodiment as well as additional advantages of the invention are described below with reference to the figures; wherein:

FIGS. 5a, 5b and 5c are graphs of temperature versus time.

DETAILED DESCRIPTION OF INVENTION

Figure 1:
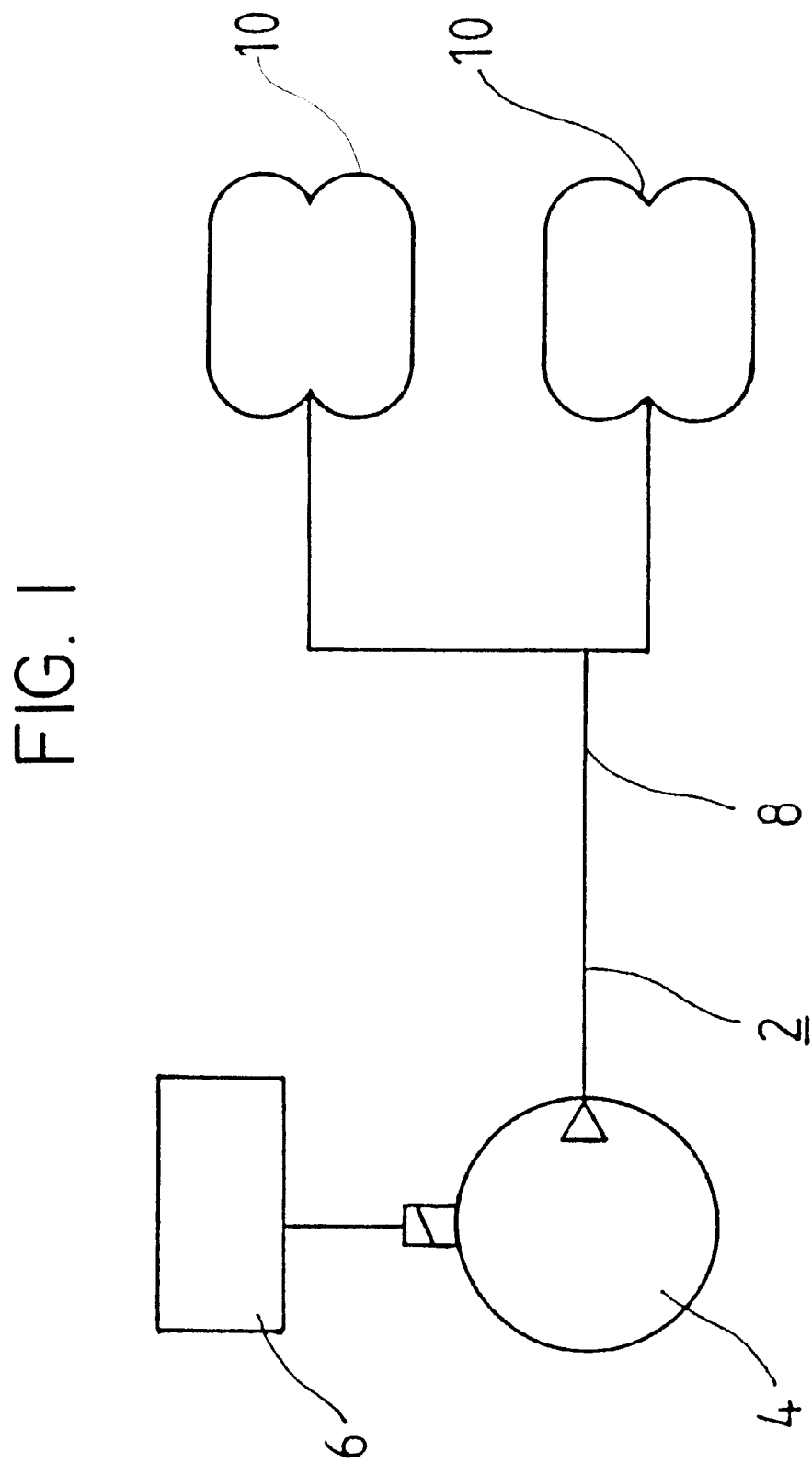
FIG. 1 is a schematic representation of a pneumatic suspension, according to the invention.

The advantages attained with the invention can, in particular, be seen in the fact that the regulating process is also continued if a predetermined limiting value in the compressor is reached. Due to the fact that the compressor is operated in a cyclic manner once it reaches the limiting value, the regulating process is slightly delayed, but no termination or extended interruption of the regulating process takes place. Despite this advantage, overheating of the compressor is reliably prevented with the method according to the invention. During the cyclic operation of the compressor, the average power consumption of the compressor is reduced by the cycle ratio (i.e., the ratio between the on-time of the compressor and the off-time of the compressor during one cycle). Consequently, it is possible to significantly reduce or entirely prevent a temperature increase in the compressor or even cause the compressor to cool off although the regulating process is continued.

According to one additional development of the method disclosed herein, the cycle time during the cyclic operation is significantly shorter than the average time required for a continuous regulating process. An average continuous regulating process requires, for example, approximately 20–30 sec, wherein the time for a cyclic regulating process is approximately 5–10 sec. In this case, the cycle time of one cycle is approximately 2–5 sec. This generally means that, if an average regulating process in a motor vehicle requires approximately x sec, the time for a cyclic regulating process is approximately 1/10 x to x sec. The cycle time of one cycle then is approximately 1/20 x to 1/6 x sec.

According to another additional development of the method disclosed herein, the cycle ratio is reduced during a cyclic regulating process as the duration of the regulating process increases. Such a reduction of the cycle ratio can be realized by maintaining the cycle time constant and reducing the on-time of the compressor in favor of the off-time of the compressor during one cycle. Another option consists of extending the cycle time by extending the off-time of the compressor during one cycle. The advantage of this measure can be seen in the fact that the average power consumption of the compressor progressively decreases as the duration of the cyclic regulating process increases. Consequently, it is ensured that the compressor is not additionally heated or even cooled, namely even during long cyclic regulating processes.

According to another additional development of the method disclosed herein, the cycle frequency is reduced during a cyclic regulating process as the duration of the regulating process increases. This additional development is based on the following notion: during a cyclic regulating process, the compressor is switched on during each cycle such that starting currents are generated in the compressor. These starting currents subject the sensitive components of the compressor (e.g., its carbon brushes) to significant stress due to ohmic losses. If only a few cycles per unit time and a correspondingly lower number of switching-on processes per unit time are carried out, damage to the sensitive components of the compressor are precluded. This extension of the switching-on processes per unit time is realized by respectively extending the cycle times or reducing the cycle frequency as the duration of the regulating process increases.

Another additional development of the method according to the invention is characterized by the fact that:
  the temperature of the compressor is estimated immediately before the regulating process, by the fact that:
  the temperature that the compressor will presumably reach at the end of the regulating process is estimated before or during the regulating process, and by the fact that:
  the compressor is initially operated continuously if the temperature of the compressor lies below a lower threshold immediately before the regulating process, wherein the compressor is operated in a cyclic manner once a permissible permanent temperature is reached if the estimated temperature that the compressor will presumably reach at the end of the regulating process lies above a certain peak temperature.

The permissible permanent temperature is preferably the temperature above which the compressor can be briefly operated without being damaged. The peak temperature preferably represents a temperature that is higher than the permanent temperature and cannot be exceeded, not even for brief durations. If the estimate carried out before or during the regulating process indicates that the compressor will almost certainly not exceed the peak temperature at the end of the regulating process, the regulating process is completed in a continuous manner, even if the permissible permanent temperature is exceeded. The advantage of the additional development according to FIG. 5 can be seen in the fact that a regulating process can also be carried out in a continuous manner, i.e., completed within the shortest possible time, if the compressor only exceeds the permissible permanent temperature for a brief duration.

The process of estimating the temperature that the compressor will presumably reach at the end of the regulating process may be carried out during the regulating process. This is, for example, realized by estimating the lifting distance required for the regulating process and the lifting speed with the aid of a height sensor. The weight with which the motor vehicle was loaded can be determined based on the lifting distance, whereafter all variables necessary for calculating the required power output of the compressor are known. The heat development in the compressor can be derived from this power output.

In one additional development of the method, the compressor is operated in a cyclic manner when the regulating process begins if its temperature lies above the lower temperature threshold immediately before the regulating process. The advantage of this embodiment can be seen in the fact that a regulating process can also be carried out in risk-free manner if the compressor is heated above the temperature threshold without reaching the critical temperature range between the permissible permanent temperature and the peak temperature immediately after the initiation of the regulating process. This is particularly advantageous in instances in which the compressor temperature briefly lies below the permanent temperature or if the compressor temperature has already reached or exceeded the permanent temperature.

FIG. 1 shows a highly schematic representation of a pneumatic suspension 2 with a compressor 4, a control unit 6, and pneumatic springs 10 that can be filled with compressed air with the aid of the compressor 4, namely via supply lines 8. However, only the details that are essential for the invention are shown in FIG. 1. The compressor 4 can be switched on and off by the control unit 6. While the compressor 4 is switched on, heat is developed in the compressor, i.e., its temperature increases. Once the compressor temperature reaches a certain limiting value, the compressor 4 is operated in a cyclic manner by the control unit 6. Consequently, overheating of the compressor 4 can be prevented as described below with reference to FIGS. 2–5.

Figure 2:
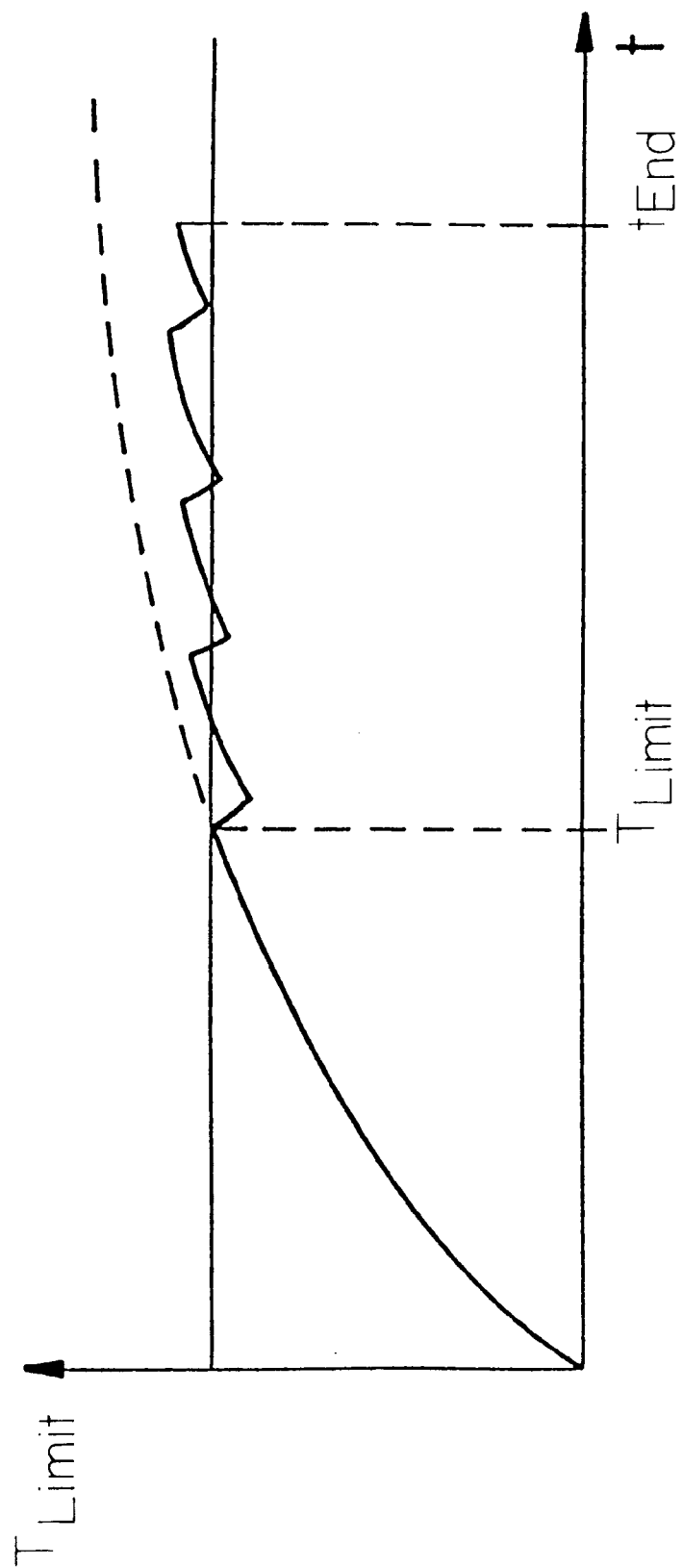
FIG. 2 is a graph of temperature versus time.

FIG. 2 shows a diagram in which the temperature T is plotted as a function of the time t. At the time t=0, the compressor 4 is switched on by the control unit 6 and a regulating process begins. The compressor 4 is initially operated continuously, namely until the temperature T has reached a limiting value $T_{limit}$ or until the elapsed time, during which the compressor is continuously operated, has reached a limiting value $t_{limit}$. Once the temperature-limiting value $T_{limit}$ or the time-limiting value $t_{limit}$ is reached, the control unit 6 operates the compressor 4 in a cyclic manner as is also indicated in FIG. 2.

The cyclic operation of the compressor results in a reduction of the average power consumption of the compressor because the compressor only consumes power during the intervals in which it is switched on. Depending on the cycle ratio determined by the control unit (i.e., the ratio between the on-time and the off-time of the compressor during one cycle), the temperature behavior of the compressor can be adjusted in such a way that the reached temperature-limiting value is slightly increased or maintained constant or even reduced. A slight increase in the temperature during the cyclic operation occurs, for example, if the cycle ratio is predetermined in such a way that the compressor is heated more intensely than it is cooled during one cycle.

A constant temperature may, for example, be achieved by predetermining the cycle ratio in such a way that the heating and cooling of the compressor are in equilibrium during each cycle. This means that a cooling of the compressor during the cyclic operation may, for example, be achieved by predetermining the cycle ratio in such a way that the compressor is cooled more intensely than it is heated during each cycle. The cycle ratio is predetermined by the control unit 6 in accordance with the desired result.

The regulating process carried out in a cyclic manner once the temperature-limiting value $T_{limit}$ or the time-limiting value $t_{limit}$ is reached lasts up to the time $t_{end}$, i.e., the time at which the motor vehicle body has reached the desired height. The regulating process is—leaving aside short interruptions during the cycles—carried out without long interruptions up to the time $t_{end}$. Consequently, the extension of the cyclic regulating process in comparison to a completely continuous regulating process is insignificant.

Figure 3:
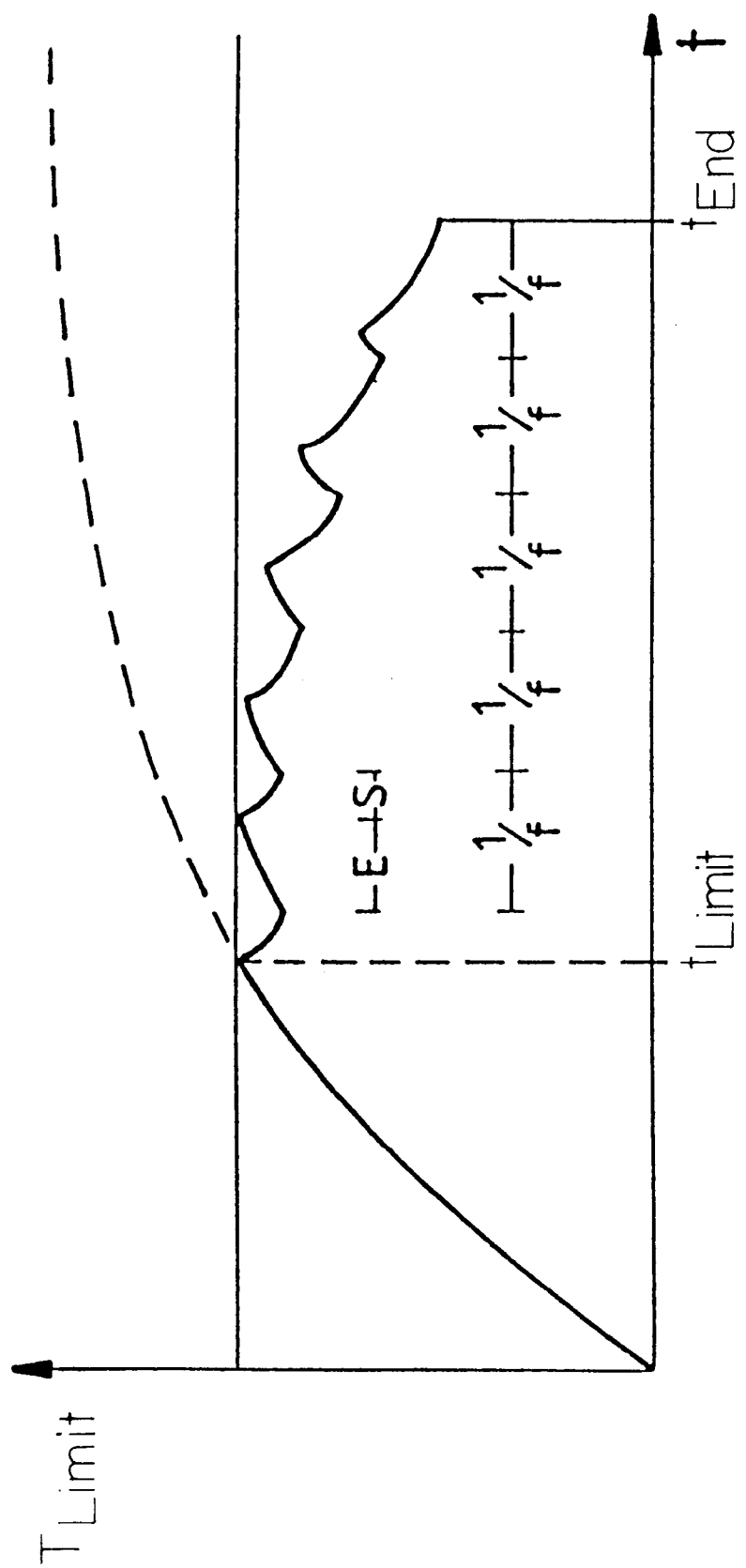
FIG. 3 is a graph of temperature versus time.

FIG. 3 also shows a diagram in which the temperature T is plotted as a function of the time t. The diagram according to FIG. 3 schematically corresponds to the diagram according to FIG. 2 up to the temperature-limiting value $T_{limit}$, or the time-limiting value $t_{limit}$, i.e., this portion of the diagram is not discussed again.

The diagram according to FIG. 3 shows that the compressor 4 is operated in a cyclic manner by the control unit 6 once it reaches the temperature $T_{limit}$ or the time $t_{limit}$. In this case, the cycle ratio during the regulating process is reduced as the duration of the regulating process increases. In the diagram shown in FIG. 3, this is achieved at a constant cycle time 1/f by reducing the on-time E of the compressor within one cycle in favor of the off-time S of the compressor within one cycle. This results in the temperature increase of the compressor progressively decreasing during one cycle, wherein the temperature drop of the compressor progressively increases during one cycle. Due to this method, cooling of the compressor 4 can be achieved, namely even if the regulating process is continued, although the compressor has previously reached the temperature-limiting value $T_{limit}$. In this embodiment, the regulating process is also completed at the time $t_{end}$.

Figure 4:
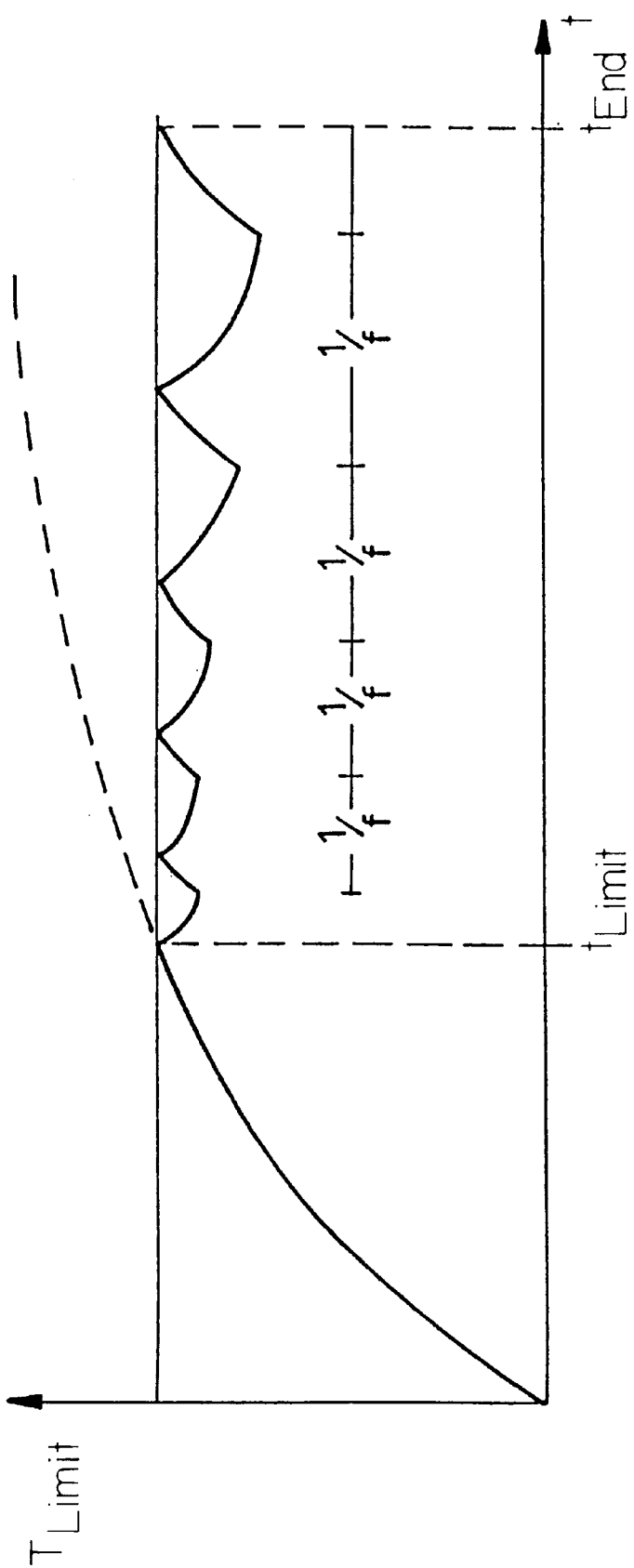
FIG. 4 is a graph of temperature versus time.

FIG. 4 also shows a diagram in which the temperature T is plotted as a function of the time t. The diagram shown in FIG. 4 also corresponds to the diagrams according to FIGS. 2 and 3 up to the temperature-limiting value $T_{limit}$ or the time-limiting value $t_{limit}$, i.e., we refer to FIG. 2 with respect to the corresponding explanations. Once the temperature-limiting value $T_{limit}$ or the time-limiting value $t_{limit}$ is reached, the control unit 6 operates the compressor 4 in a cyclic manner.

FIG. 4 shows that the cycle frequency f is reduced or the cycle time 1/f is increased during the cyclic regulating process as the duration of the regulating process increases. This results in less switching-on processes of the compressor having to be carried out per unit time during the cyclic operation of the compressor as the duration of the regulating process increases. Consequently, fewer starting currents are generated in the compressor 4, and the thermal stress, to which sensitive components of the compressor 4 are subjected due to these starting currents, is decreased. In this embodiment, the regulating process is also completed at the time $t_{end}$.

Figure 5A:
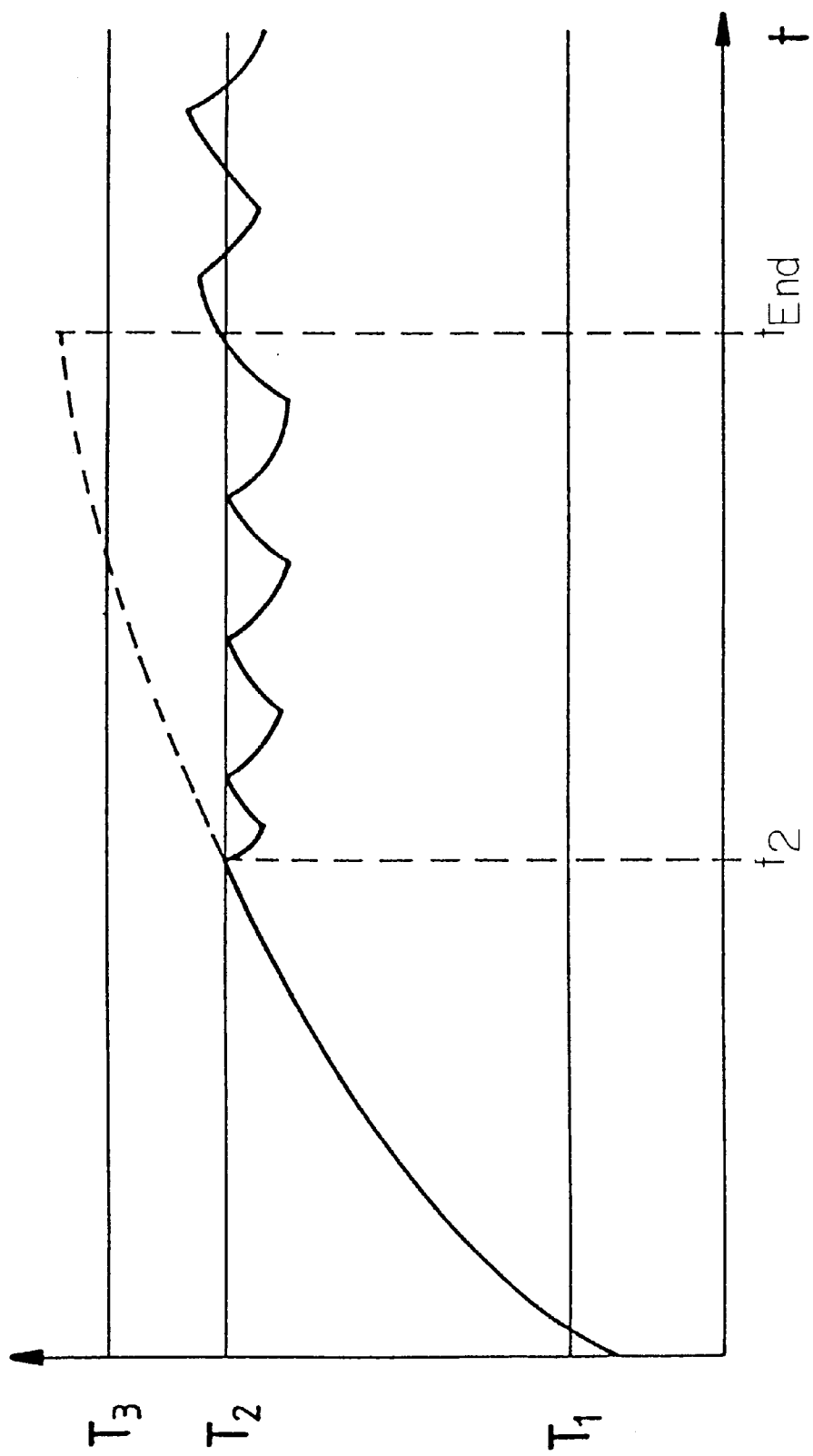

FIGS. 5(*a–c*) also shows a diagram in which the temperature T is plotted as a function of the time t. In the diagram according to FIGS. 5(*a–c*), three temperature-limiting values are shown, namely a lower temperature threshold $T_1$, a permissible permanent temperature $T_2$, and a peak temperature $T_3$. The temperature of the compressor 4 is estimated immediately before the regulating process. If this temperature lies below the temperature threshold $T_1$ as is the case in the diagram according to FIG. 5*a*, the regulating process begins with the compressor operating continuously. The temperature that the compressor 4 will presumably reach at the end of said regulating process is estimated during said regulating process. If this temperature lies above the peak temperature $T_3$ at the end of the regulating process (i.e., at the time $t_{end}$) as is the case in FIG. 5*a*, the compressor is operated in a cyclic manner (see FIG. 5*a*) as soon as the permissible permanent temperature $T_2$ or the time $t_2$ is reached. In this case, it is also possible for the control unit 6 to operate the compressor 4 with such a cycle ratio that the temperature of the compressor slightly increases, remains constant, or decreases.

Figure 5B:
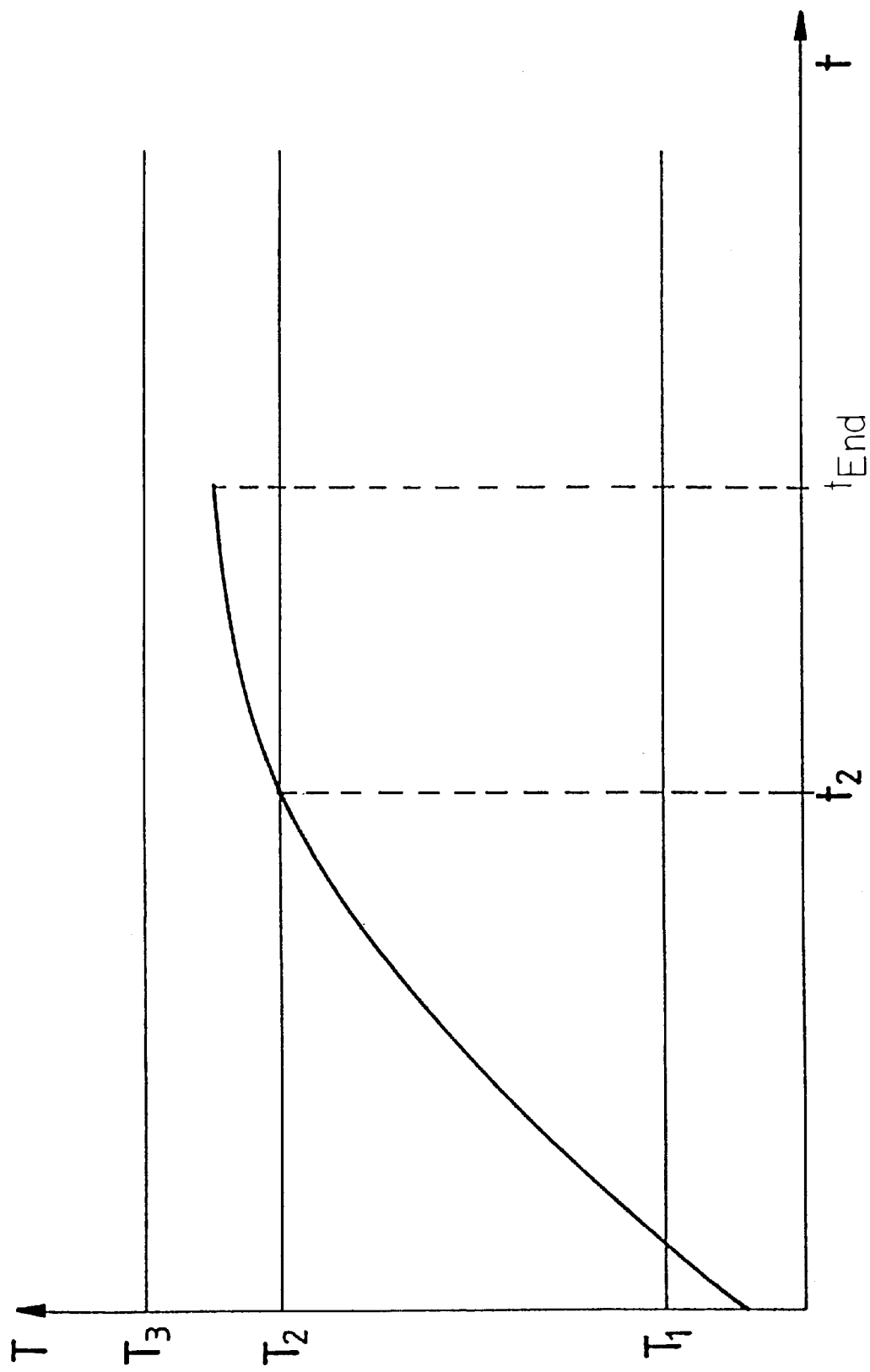

The diagram according to FIG. 5*b* shows an embodiment in which the temperature of the compressor 4 lies below the lower temperature threshold $T_1$ immediately before the regulating process. The temperature that the compressor will presumably reach at the end $t_{end}$ of the regulating process is also estimated during the regulating process in this case. If this temperature lies below the peak temperature $T_3$ as is the case in the diagram according to FIG. 5*b*, the regulating process is carried out continuously, namely even above the permissible permanent temperature $T_2$. Although the permissible permanent temperature $T_2$ is exceeded for a certain duration ($t_{end}-t_2$), the permissible permanent temperature $T_2$ is predetermined in such a way that the compressor 4 is not damaged if the permissible permanent temperature is briefly exceeded.

The diagram according to FIG. 5*c* shows an embodiment in which the estimated temperature of the compressor 4 already lies above the lower temperature threshold $T_1$ immediately before the regulating process. In this case, the regulating process begins in a cyclic manner, wherein the cycle ratio is predetermined by the control unit in such a way that the temperature of the compressor 4 slightly increases, remains constant, or decreases. This measure ensures that the temperature of the compressor does not exceed the peak temperature $T_3$, namely even if the temperature of the compressor already lies near the permissible permanent temperature $T_2$ at the beginning of the regulating process. If the temperature of the compressor 4 lies below the permissible permanent temperature $T_2$ at the beginning of the regulating process, the cycle ratio can be adjusted in such a way that the temperature of the compressor 4 slightly increases until it lies within the temperature range between the temperatures $T_3$ and $T_2$. If the temperature at the beginning of the regulating process already corresponds to the permissible permanent temperature $T_2$ or exceeds this temperature, the control unit 6 predetermines the cycle ratio in such a way that the average temperature of the compressor 4 remains constant or decreases. In this case, it is also ensured that the compressor 4 does not exceed the peak temperature $T_3$, and that the compressor is not operated above the permissible permanent temperature $T_2$ for an excessively long time.

Further variations and modifications will be apparent to those skilled in the art from the foregoing and are intended to be encompassed by the claims appended hereto.

German priority application 198 10 764.1 is relied on and incorporated herein by reference.

What is claimed is:

1. A method for controlling or regulating a compressor or motor that can be switched on and off on demand, comprising the steps of:

switching the compressor on and off with a control unit provided with the compressor;

operating the compressor continuously up to a limiting value; and operating the compressor in a cyclic manner once the limiting value is reached, wherein the control unit operates the compressor.

2. The method for controlling or regulating a compressor or motor that can be switched on and off on demand according to claim 1, wherein the cycle time during the cyclic operation is significantly shorter than the time required for a continuous regulating process.

3. The method for controlling or regulating a compressor or motor that can be switched on and off on demand according to claim 1, wherein the cycle ratio during a cyclic regulating process is decreased as the duration of the regulating process increases.

4. The method for controlling or regulating a compressor or motor that can be switched on and off on demand according to claim 1, wherein the cycle frequency is reduced during a cyclic regulating process as the duration of the regulating process increases.

5. The method for controlling or regulating a compressor or motor that can be switched on and off on demand according to claim 1, further comprising the steps of:

estimating the temperature of the compressor immediately before the regulating process;

estimating the temperature that the compressor will presumably reach at the end of the regulating process before or during the regulating process; and initially operating the compressor continuously if the temperature of the compressor lies below a lower threshold immediately before the regulating process, wherein the compressor is operated in a cyclic manner once a permissible permanent temperature is reached if the estimated temperature that the compressor will presumably reach at the end of the regulating process lies above a certain peak temperature.

6. The method for controlling or regulating a compressor or motor that can be switched on and off on demand according to claim 5, wherein the compressor is operated in a cyclic manner at the beginning of the regulating process if its temperature lies above the lower temperature threshold immediately before the regulating process.

7. A compressor or motor that can be switched on and off on demand, wherein a control unit that switches the compressor on and off is provided with the compressor, wherein the control unit operates the compressor continuously until a limiting value is reached, wherein the control unit operates the compressor in a cyclic manner once this limiting value is reached.

8. The compressor or motor that can be switched on and off on demand according to claim 7, wherein the cycle ratio during a cyclic regulating process can be decreased by the control unit as the duration of the regulating process increases.

9. The compressor or motor that can be switched on and off on demand according to claim 7, wherein the cycle frequency during a cyclic regulating process can be decreased by the control unit as the duration of the regulating process increases.

10. The compressor or motor that can be switched on and off on demand according to claim 7, wherein the temperature that the compressor will presumably reach at the end of the regulating process can be estimated in the control unit.

11. A pneumatic suspension system containing a compressor according to claim 7.

* * * * *